United States Patent [19]

Lemelson

[11] 3,803,350

[45] Apr. 9, 1974

[54] RECORD CARD SCANNING APPARATUS

[76] Inventor: Jerome H. Lemelson, 85 Rector St., Metuchen, N.J. 08840

[22] Filed: Sept. 5, 1972

[21] Appl. No.: 286,056

Related U.S. Application Data

[63] Continuation-in-part of Ser. No. 83,239, Oct. 22, 1970, abandoned, which is a continuation-in-part of Ser. No. 807,877, March 17, 1969, abandoned.

[52] U.S. Cl......... 178/6, 178/DIG. 22, 235/61.11 D

[51] Int. Cl...... G06k 9/00, G06k 15/20, H04n 7/18

[58] Field of Search.................. 178/6, 6.8, DIG. 22; 235/61.11 R, 61.11 D; 340/174.1 F

[56] References Cited

UNITED STATES PATENTS 2,918,656 12/1959 Nolde ................................ 340/173

*Primary Examiner*—Howard W. Britton

[57] ABSTRACT

An oblong magnetic record strip or card and a transducing device are provided together with control means for effecting recordings on selected record tracks of the card. The card or strip may be used as a storage medium for full frame video signals such as composite picture signals of documents. A plurality of such signals are selectively recorded on a card and selectively reproduced therefrom and utilized to generate images on a monitor of the original documents scanned to generate the video signals. Signals are magnetically recorded longitudinally and, in certain instances, oblique to the longitudinal axis of the card. Means are provided for repeatedly reproducing the same video signal from the recording thereof on the card and applying same to maintain a still image on a monitor screen.

14 Claims, 13 Drawing Figures

INVENTOR.
JEROME H. LEMELSON

INVENTOR.
JEROME H. LEMELSON

RECORD CARD SCANNING APPARATUS

RELATED APPLICATIONS

This is a continuation-in-part of application Ser. No. 83,239 filed Oct. 22, 1970 and now abandoned, which was a continuation-in-part of application Ser. No. 807,877 filed Mar. 17, 1969, now abandoned and having as a parent application Ser. No. 417,386 filed Dec. 10, 1964 which issued as U.S. Pat. No. 3,434,130 on Mar. 18, 1969 entitled *Record Card Scanning Apparatus*. The latter is a continuation-in-part of application Ser. No. 142,748 filed Aug. 28, 1961 now U.S. Pat. No. 3,646,258.

SUMMARY OF THE INVENTION

This invention relates to a recording arrangement for record cards and flat strips containing magnetic recording material and a system employing such record members to store document information and the like by magnetically recording such information on selected of a plurality of record tracks of each card. In particular, the document information may comprise full frame video signals such as full frame composite video picture signals generated in scanning document or still pictures.

It is known in the art to record coded information on cards in the form of punchings or cutouts, the location and number of which determine one or more codes which are representative of information. Information is also recorded in the form of microfilm images on so-called aperture cards. However, both these forms of record-keeping suffer a number of shortcomings including the inability to update or erase pictorial information on a card or to update, erase or change code information provided on the card which describes or references the pictorial information. As a result, if changes should be required in the information provided on a card, the card must be destroyed or mechanically operated on to change or replace the information recorded previously on the card.

Accordingly, it is a primary object of this invention to provide a new and improved record card recording and reproduction apparatus and method for selectively recording a plurality of information signals on a card.

Another object is to provide a recording arrangement and a system for erasably recording document information on a plurality of record cards and selectively reproducing same as electrical signals and applying said electrical signals to generate pictorial representations of the information recorded.

Another object is to provide a new and improved apparatus for recording a plurality of document image signals on selected areas of a plurality of record cards and selectively reproducing said signals and applying same to generate visible images and hard copy.

Another object is to provide new and improved apparatus for handling record cards and recording information on a plurality of recording tracks which extend oblique to the card longitudinal axis.

Another object is to provide a magnetic recording system for single-frame video picture signals and apparatus for reproducing selected of the recorded signals to generate images thereof on a cathode ray tube, said apparatus being operative to reproduce a selected picture signal after it has been set or programmed to effect said reproduction in a time which is substantially shorter than the average access time of a document image signal recording apparatus employing video tape.

The nature of the invention, as to its objects and advantages, the mode of its operation and the manner of its organization may be better understood by the referring to the following description taken in connection with the accompanying drawing forming a part thereof in which.

Figure 1:
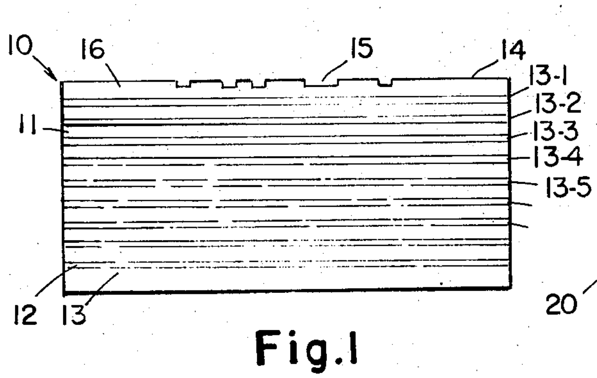
FIG. 1 is a face view of one form of record card in accordance with the instant invention and employing a plurality of record tracks extending parallel to the longitudinal axis of the card.

In FIG. 1 there is shown a record card 10 comprising a base 11 in the form of an oblong strip or sheet of plastic, paper or paperboard having a major surface 12 on which is coated, laminated or otherwise provided a magnetic recording material 13' such as a magnetic oxide which is disposed across the entire face 12 or as one or more strip or band portions extending longitudinally thereof. Notations 13-1, 13-2, 13-3, etc. refer to magnetic recording tracks extending parallel to each other and longitudinally along the length of member 10 in the magnetic recording material. On each track is recorded one or more full frame video picture signals derived as described in my U.S. Pat. No. 3,051,777 for Magnetic Recording, which video picture signals are operative, when reproduced from the track, for modulating the write beam of a television picture tube to generate a still image on its screen of a document such as a business form, picture, graph, drawing, map, etc. In a preferred form of the invention, the video picture signals provided on tracks 13 are composite picture signals derived by scanning a single image frame during at least one complete raster scan although each may comprise (*a*) a composite video signal including sync signal components and picture signal derived from a plurality of scans of the same field, (*b*) a plurality of different composite video picture signals, or (*c*) just the picture signal component with vertical and horizontal sync signals for all recording picture signals predeterminately located on a separate track. In the latter arrangement, all picture signals on the different tracks would be in predetermined alignment with respect to each other and the sync signals so that the single track recording of sync signals may be reproduced and used to control write-beam deflection for the reproductions of any selected picture signal.

Selection of card 10 from a plurality of similar cards in a stack or magazine arrangement thereof is effected by scanning one or more edges of the card along which, in FIG. 1, is provided a plurality of indentations or notches 15. Portions 16 of the edge 14 remain in tact and together with indentations 15, provide a scannable surface in the form of a code identifying the card.

The tracks 13 may each be provided (*a*) on a separate strip of magnetic recording material coated or laminated to the surface 12, (*b*) on a magnetic recording material disposed along the central area of 12, (*c*) on a magnetic recording material coating the entire face 12 or (*d*) in the card material itself which is a magnetic recording plastic, metal band or a length of 1 to 3 inches wide magnetic recording tape.

The upper edge 14 of member 10 may also contain printed marks in the form of an electro-optically scannable code, or magnetic recording material containing one or more codes identifying the card recorded therein.

Figure 2:
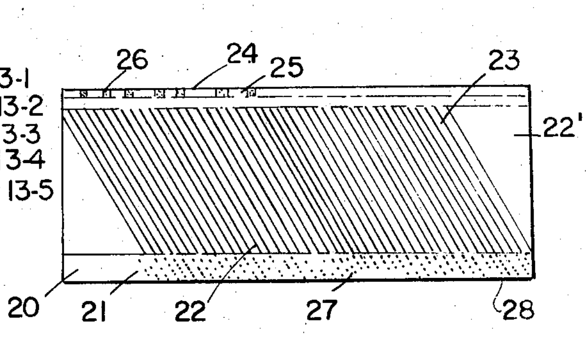
FIG. 2 is a face view of another form of record card having a plurality of record tracks which extend oblique to the longitudinal axis of the card.

In FIg. 2 an oblong recording strip or card 20 is shown having a major face 21 containing a magnetic recording material 22 centrally disposed as a band 22' or extending completely across said face as in a magnetic recording tape. Recorded along recording band area 22' on a plurality of parallel tracks 23, which are oblique to the longitudinal axis of member 20, are a plurality of the described composite video picture signals each capable of modulating the beam of a television picture tube or storage tube to generate a still image therein.

The separately reproducible video picture signals recorded on tracks may each be recorded on a separate oblique track 23 or a separate group of said tracks or may occupy portions of each or different of said tracks with other selectively reproducible video picture signals as arranged in transverse track recording on wide magnetic tape employing, for example, magnetic recording heads which rotate as the recording member is driven past. Reference is made to my copending application Ser. No. 225,173 for Videotape Recording and U.S. Pat. No. 3,051,777 for such a recording arrangement.

Figures 3, 4:
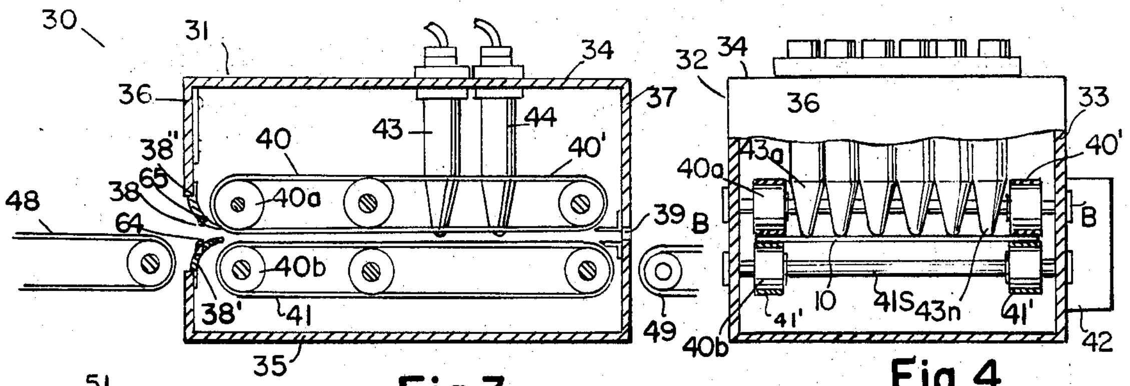
FIG. 3 is a side view with parts broken away for clarity of one form of automatic card recording and reading device.
FIG. 4 is an end view with parts broken away for clarity of the device of FIG. 3.

While the selective reproduction of video signals from the member 10 of FIG. 1 may be effected by relatively moving the member and a reproduction transducer while the transducer is in operative relation with the track containing the selected video signal, in FIG. 2 selective reproduction of the desired video signal is effected by means of codes identifying the desired signal or track on which it is recorded. In FIG. 3 a plurality of binary digital codes 28 are provided along an edge portion 27 of the card, preferably although not necessarily, in the magnetic recording material 21. The codes 28 are positioned so as to locate each track or group of tracks containing one or more video picture signals, and are aligned with respective tracks 23. Selection codes per se or supplemental to the codes on track 27 may also be provided on oblique tracks 23 adjacent the video signal recordings between video signal recording and may be provided as series and/or parallel binary bit codes which are reproduced by the same transducer reproducing video picture signals a separable therefrom, or a separate stationary transducer.

Notation 25 refers to a band recording area along a longitudinal edge 24 of member 20 containing one or more marks or magnetic bit recordings 26 extending over and along said edge for identifying the card and/or its recording material by scanning said edge with magnetic or photo-optical means.

FIGS. 3 and 4 illustrate an apparatus 30 for transducing information signals relative to magnetic recording cards of the type shown in FIG. 1 as the cards are fed through said apparatus. The transducing apparatus includes a housing 31 having a substantially rectangular box-like configuration with flat side walls 32 and 33 connected to top and bottom walls 34 and 35 and end walls 36 and 37. Provided in the end walls 36 and 37 at substantially the same level are respective elongated slotted openings 38 and 39 for receiving and rejecting a flat record member such as the card 11 of FIG. 1. The opening 38 is defined by curved guide means 38' and 38'' adapted to receive a card fed thereto by hand or from a feed conveyor 48 and guide same between respective pairs of narrow belts 40' and 41' driven around respectiive pairs of rollers, denoted 40'' and 41'', which are disposed at both sides of the housing as illustrated in FIG. 4 and comprise belt conveying assemblies for prepositioning and predeterminately driving cards fed to the housing therethrough past respective banks of transducing heads denoted 43' and 44' which are supported on mounts 43 and 44 between the pairs of belt conveyors 40 and 41. The rollers are supported on shafts **40*s* and 41*s* which are supported in rotational bearing by ball bearings B secured to the side walls 32 and 33 of the housing. A constant speed gear motor 42 mounted on the side wall 33 of the housing is operatively coupled to the ends of the shafts 40*s* and 41*s* supporting at least two pairs of the rollers so as drive, when energized, the belts thereof for driving a card disposed therebetween through the housing. The belts and rollers are so located as to cause the ends of the transducers 43' and 44' to engage respective of the tracks 13 of the card 11 for transducing relative thereto. The heads 44 are disposed to be operatively aligned with respective code or sync signal tracks of the record member 11 while the heads 43 are located to record or reproduce video picture signals from the tracks of the record card 11 as it is driven through the housing. The heads 44** may therefore be utilized to record or reproduce so-called marker signals derived, as described in my said parent applications, from the vertical sync signal of the video picture signal which is recorded or originally provided as a trigger signal for triggering the operation of a video camera in scanning a selected image field or document so as to generate said video picture signal.

The apparatus 30 of FIGS. 3 and 4 may be utilized to selectively record single frame composite video picture signals on selected tracks 13 of the card 11 when said heads are energized in the recording mode or to selectively reproduce previously recorded picture signals from the card when said heads are energized in the reproduction mode. In the record mode of operation, the leading edge of a card fed to the opening 38 is sensed by a transducer 64 such as a cadmium sulfide photoelectric cell or a photo-transistor supported at the center of the guide 38' defining the opening 38 when light from a small light source 65 supported on the other side of the opening 35 by the upper guide for the card is interrupted by the card. The resulting interruption in light to the sensor 64 is operative to cause a pulse signal to be generated in a control circuit operatively connected to the transducer 64 and said signal may be utilized to trigger the read beam of a television camera scanning a selected image field such as a document after the card has been properly located with respect to the picture signal recording heads 43 within the housing. Suitable time delay means may be operatively connected to the output of the transducer 64 so as to permit the leading edge of the card to come into alignment with the recording transducers 43 before the video picture signal is generated so that the leading end of said video picture signal will be properly and predeterminately recorded on the selected track of the record card.

In the reproduction mode, the marker signal pick-up head 43 either reproduces a marker signal associated with the selected recorded video picture signal on a selected marker signal track which is adjacent the track containing the selected video picture signal or a single marker signal pick-up head may reproduce a frame indicating marker signal from a pulse recording on one track of the card if all the video picture signals recorded on the other tracks are laterally aligned so as to be predeterminately longitudinally located with respect to said marker signal.

In another form of operation of the apparatus illustrated in FIGS. 3 and 4, frame marker signals may be completely eliminated from all record cards as their function may be performed by the photoelectric detection means 64 connected to a suitable time delay relay. In this mode of operation, the leading edge of the card serves, as described, when detected by a suitable photoelectric detection means, as a means for generating a signal which may be utilized to effect the recordings of single frame video picture signals at predetermined locations at each of the recording tracks and other synchronizing functions, if necessary, during reproduction of selected of said video picture signals.

Suitable computer controlled or manually operated switches in the input or output lines of the transducers 43 and 44 may be selectively operated to selectively record on or reproduce from selected tracks of a card as it is driven through the housing 31.

Figures 5, 6:
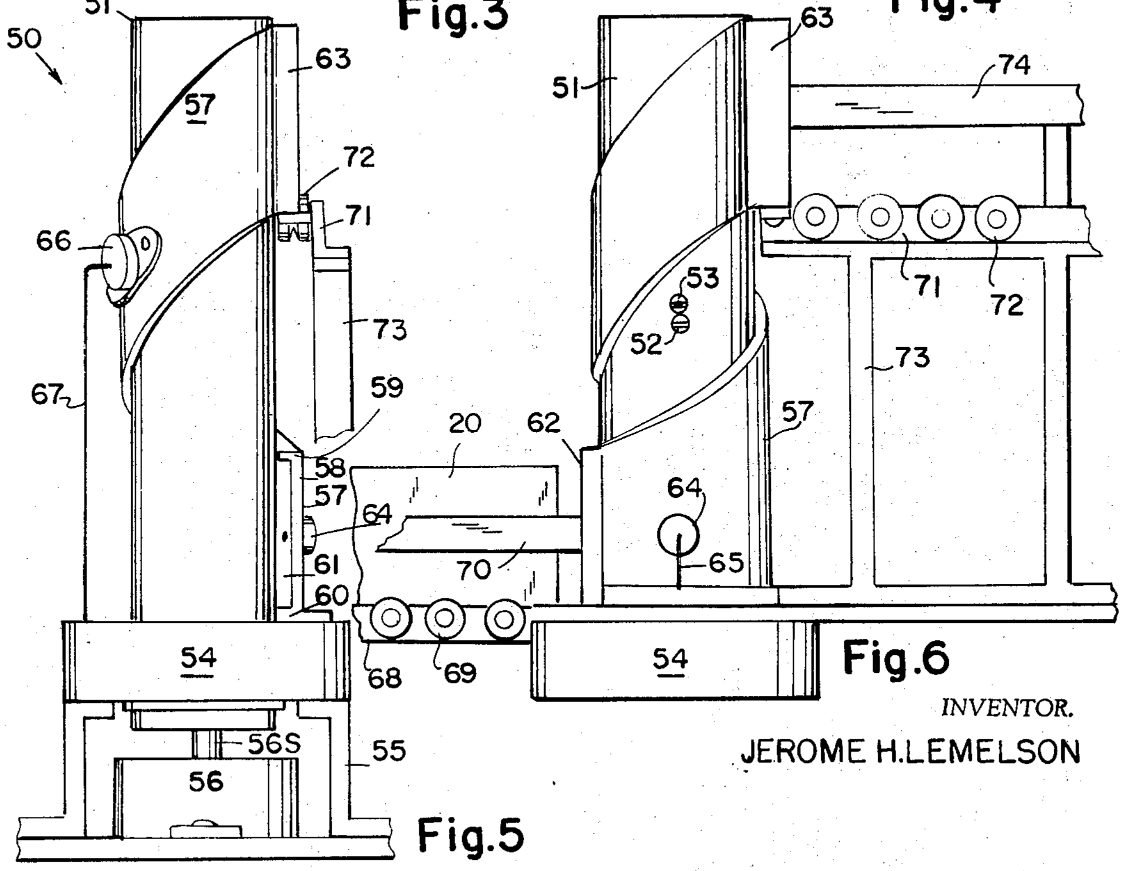
FIG. 5 is a side view of another form of recording and reading device for record cards employing magnetic recordings which are transverse to the longitudinal axis of the card.
FIG. 6 is an end view of the device of FIG. 5.

In FIGS. 5 and 6 is shown an apparatus for transducing in the recording or reproduction modes, signals such as document image or information signals relative to a record card on a plurality of tracks which are oblique to the longitudinal axis of the card as illustrated in FIG. 2, for example. The apparatus 50 includes a rotating drum containing a plurality of transducers, two of which 52 and 53 are shown, which are disposed with their operating ends located at or near the surface of the drum and rotatable therewith. A guide 57 is spirally wound about the drum 51 and is composed of a side wall 58 and upper and lower end walls 59 and 60 defining a substantially flat, spiral volume 61 providing a helical passageway immediately adjacent the drum through which passageway a card may be driven around the drum from an inlet opening 62 located at one level to an exit opening 63.

The drum 51 is supported for rotation in a suitable bearing unit 54 which may comprise a ball or roller bearing or an air bearing which is supported from below on a mount 55 which may comprise the main housing of the reading unit 50 or may be secured to said reading unit housing. Individual cards are fed horizontally along a conveyor 68 composed of power driven V-shaped wheels 69 which are aligned to feed the leading edge of the card into the inlet opening 62 of the spirally shaped guide 57. The card may be slidably or frictionally engaged between the outer surface of the rotating drum 51 and the inner surface of the side wall 58 of the guide 57 whereby the rotation of the drum 51 may be operative to drive the card upwardly through the guide 57 and past the rotating transducing heads 52, 53. Other means including air pressure, free-wheeling or powered rollers supported by the side wall 58 of the guide 57 may be disposed so as to engage the outer surface of the card and force its inner surface against the rotating drum 51. Air ejected through openings in the wall 58 of guide 57 along the length of the wall may also be employed to apply relative force to the card to bring it into engagement with the surface of drum 51. The openings in wall 58 to which said air is ejected may also be directed to cause said air to impose a force on the card in the direction of the passageway 61 defined between the guide 57 and the surface of the drum to help move same.

The constant-speed gear motor 56 is supported by the frame 55 and has its output shaft 56s operatively connected to the drum 51 below the bearing 54 for rotating said drum at a speed such that the video picture signal will be properly recorded on or reproduced from the selected oblique track 23 of the record member 21 as it is driven around the drum.

Disposed near the entrance 62 of the guide way 57 is a sensor 64 such as a photo-transistor or other type of transducer operative to sense the leading edge of the card as it enters the passageway 61. The output 65 of the sensor 64 is connected to a suitable control circuit which receives the pulse generated thereby and includes suitable time delay means for energizing the drum transducer to record on or reproduce from a selected track of the multi-track transverse recording areas 23 of the card 20.

Also illustrated in FIG. 5 is a solenoid 66 which is operative attached to a portion of the wall 58 of the guideway 57 and has its output shaft extending through a small opening in said wall. When the solenoid 66 is energized, its output shafts protrudes in a manner to engage a portion of the card so as to predeterminately stop the longitudinal movement of the card through the passageway 61 with a selected of the plurality of tracks 23 aligned with one of the transducers 52 associated with the drum 51. The rotating transducer will thus repeatedly scan the same track of the card. If the drum is rotating, for example, at thirty revolutions per second and the transducing head 52 is operating in the reproduction mode, the same single-frame video picture signal recorded on the track scanned by the head will be reproduced thirty times per second and may be fed to a conventional video monitor such as a television receiver so as to generate a still picture image on the display screen thereof. Thus, the combination of the sensor 64 sensing the leading edge of the card and an adjustable time delay relay means activated by the output of the sensor and operative to control the solenoid 66, may be utilized to predeterminately locate a selected track 23 of the card and the rotating transducer of the drum in a manner to effect the generation of a video picture signal of selected recorded document information from a plurality of such recordings on the card and to repeat the reproduction of said video picture signal at a frequency such that it may be utilized to generate a still image on a conventional television receiver.

It is noted that the spiral guide member of FIGS. 5 and 6 may be replaced by a tubular member surrounding drum 51 and having a spiral groove substantially the width of the card formed in its inside surface to define a passageway through which cards of the type shown in FIG. 2 may be driven for transducing different video picture signals or other suitable information relative to selected oblique recording areas or tracks thereof.

Figures 7, 8:
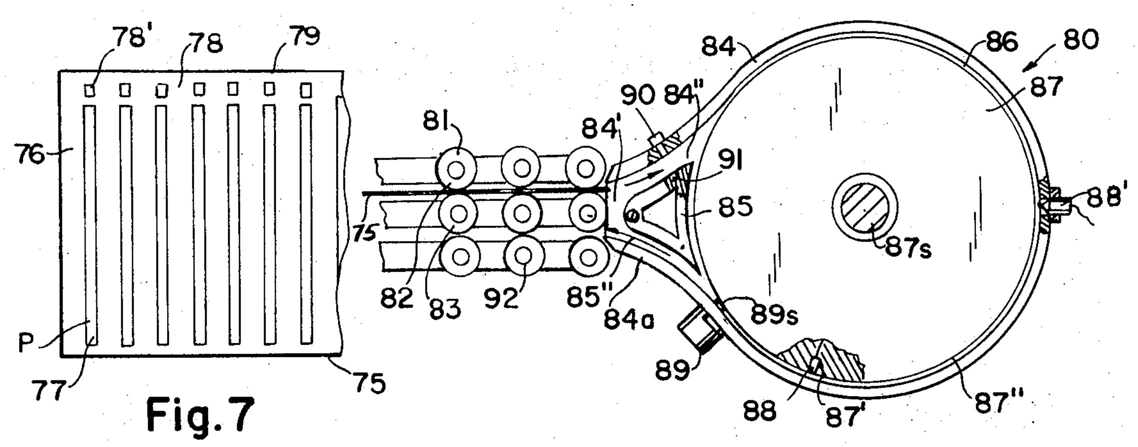
FIG. 7 is a face view of another form of magnetic record card having a plurality of record tracks which extend transverse to the longitudinal direction of the card.
FIG. 8 is a side view of an apparatus for transducing signals with respect to a card or strip having recordings of the type shown in FIG. 7.

FIG. 7 illustrates a modified form of the record card shown in FIG. 2 wherein an oblong record card 75 is provided having a first magnetic recording area 76 thereof containing a plurality of short record tracks or channels 77 which extend at right angles to the longitudinal axis of the card from near one edge of the card to the border of a band-like marker or code signal recording areas 78 of the card which also contains magnetic recording material. The edge 79 of the card may containing card selection codes defined by a plurality of notched as shown in FIG. 1 or a plurality of magnetic or optically scannable recordings as shown in FIG. 2. A complete composite video picture signal may be recorded on one or a plurality of the transverse record tracks 77 depending upon the width of the card and the manner in which video picture signal information is recorded on each track. Notation 78' refers to code signals recorded in alignment with each or groups of the tracks 77 and reproducible to identify the information recorded on the respective tracks.

In FIG. 8, an apparatus 80 is provided for selectively reproducing picture signal information recorded on the tracks 77 of the card 75 of FIG. 7. The card 75 is fed through a plurality of powered rollers 81 including a first set of upper rollers 82 cooperating with a second set of lower rollers 83 and terminating to feed the card between guides 84 and 85 disposed near a rotating drum 87. The guide 84 extends just off the surface of the drum 87 and defines a narrow sheet-like passageway 86 therebetween and the surface of the drum 87 through which passageway the card may be guided and driven around the drum by means as described above.

The drum 87 is supported on a shaft 87s which is driven by a constant-speed gear motor (not shown). Disposed within a plurality of recesses 87' in the outer surface 87'' of the drum R a plurality of transducers, one of which 88 is shown in the sectioned portion of the drum, there being at least one transducer to record on each of the laterally extending record tracks 77 of the card and/or to reproduce therefrom. The transducers are each connected to respective slidable brush-commutating means for transmitting electrical energy from a remote source to the transducer and, in the reproduction mode, for transmitting modulated electrical signals from the transducer to a remote recorder, computer or monitor. The commutating means is not shown in the drawing nor are details of the drive motor and mount for the drum 87 as such structures are known in the art.

In operation of the apparatus 80 of FIG. 8, a card 75 is driven with its lateral edge 79 disposed as the leading edge of the card between the sets of powered rollers 81 and 82 into an inlet defined between one end of the guide 84 and one wall of a second guide member 85 which is pivotally mounted on the end wall 84''. The guide 85 is shaped to upwardly deflect the card between the inner surface of guide 84 and the surface of the drum 87. The drum 87 is operative to frictionally engage the card and cooperate with the powered drive rollers 82 and 83 in carrying the card through the passageway 86 around the drum.

During its passage through inlet 84', the leading edge of the card which is the lateral edge 79 thereof moves past a photoelectric detection device 90 such as a photo-transistor or cadmium sulfide photoelectric cell which normally receives light from a small light source 91 mounted on the opposite side of the inlet passage within the guide or card deflector 85. When light from the light source 91 is interrupted to the photoelectric cell 90 as the leading edge of the card is driven across the light source 91, the photoelectric control associated with the photoelectric cell 90 is operative to generate a pulse signal as will be described hereafter, which signal may be utilized to predeterminately retain the card in position as selected recordings thereof are automatically reproduced.

Two modes of operation of the apparatus 80 of FIG. 8 are noted. In one mode, the card is driven by force applied thereto by the arm 87 as it rotates and is guided through the space 86 while one or more stationary transducer heads 88' supported by the guide 84 scan and transduce signals relative to one or more tracks 77 on the outside surface of the card. If the card is maintained against the surface of the drum 87 by suction pressure applied to the interior of the drum through small openings in its peripheral wall, the card may be repeatedly rotated with the drum and a selected video picture signal reproduced therefrom at video frequency in such a manner as to modulate the image generating electron beam of a cathode ray tube defining part of a monitor for viewing the recorded information. In this mode of operation, the card would necessarily be entirely retained against the drum and the distance between the leading and trailing edges of the video picture signals would necessarily be equivalent in the time required to scan from the trailing edge to the leading edge for the time duration of the blanking interval between conventional video motion picture signals. Release of the card from the surface 87'' of the drum 87 may be effected by suddenly applying a positive pressure to the interior of the drum so as to cause the leading edge of the card to engage the inside surface of the guide 84 and to be caught by the tapered edge of guide 85 to carry the card away from the drum through the passageway 85'' between the lower side wall of the guide 85 and the extension 84a of the guide 84 from which passageway the card is passed between the powered rollers 83 and 92 to a storage location.

In a second mode of operation, the card is engaged by friction or suction means against the outer surface 87'' of the drum 87 and is carried thereby through the passageway 86 until it is stopped by the shaft of a solenoid 89 mounted on the guide 84 and projected to effect said card stoppage upon detection of the leading edge of the card by a photoelectric cell 90 scanning a light source 91 mounted on the guide 85. The photoelectric controller associated with 90 is operative, when the light source 91 is interrupted, to energize the solenoid 89 to project its shaft in the path of the card until it is retracted as will be described hereafter. Once the card is stopped by the shaft of solenoid 89, the drum 87 continues to rotate the heads 88 mounted therein in the act of scanning the track 77 of the card and such scanning action may be continued for a single scanning sweep of the selected recording track of the card or for a predetermined length of time so as to generate video picture signals at a frequency such that said signals may be used to generate a still image on the screen of the video monitor by intensity and deflection controlling the beam thereof at video frequency (e.g. 30 frames per second).

Figures 9, 10:
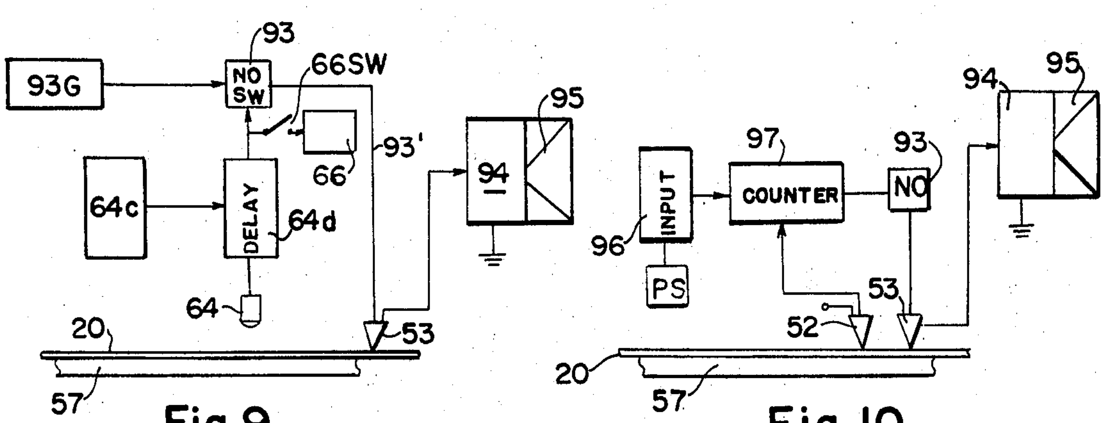
FIG. 9 is a circuit diagram illustrating means for sensing the leading edge of a magnetic record card to effect control of transducing with respect to a selected track of the card.
FIG. 10 shows part of a control diagram which includes a pulse counter for effecting control of a transducing operation relative to a record card.
Figure 11:
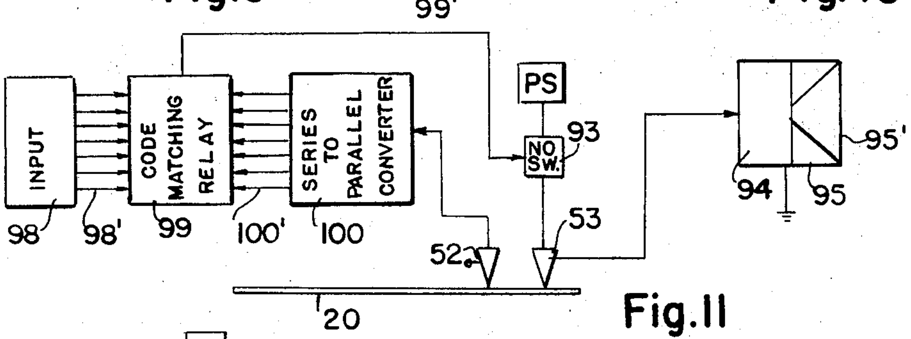
FIG. 11 is part of a control diagram illustrating code matching means for controlling a transducing operation relative to a record card by matching codes reproduced in scanning the record card with an input code.

FIGS. 9–11 illustrate control circuitry associated with the described record card scanning apparatus. In FIG. 9, the sensor 64 of FIGS. 5 and 6 is operative to scan and detect the leading edge of the card and generate an output signal upon effecting such detection which signal is amplified and passed to an adjustable time delay relay 64*d* which is adjusted in time duration by a controller 64*c* to generate a signal on its output at a time after the leading edge is detected by the sensor such that a particular track of the oblique tracks 23 is in alignment with the transducer head 53 mounted on the drum. The output of relay 64*d* is passed to the switching input of a normally open switch 93 which it immediately closes passing an electrical signal from a signal generator 93*g* to the drum mounted transducer 53. In the record mode, the signal generator 93*g* may comprise a television camera and switch 93 may comprise the input to the automatic deflection control circuitry of the camera which, when energized, causes the read beam of said camera to scan a document or other information in the scanning field of the camera and to generate a corresponding composite video picture signal on the output 93' which is passed to the transducer 53 which operates to record said composite video picture signal on the selected track 23 of the magnetic recording area 22 of the card. In the reading mode, the signal generator 93*g* may comprise a suitable power supply for generating electrical energy for energizing the transducer 53 sufficiently to cause the transducer to read signals recorded on the selected track of the card. Accordingly, during the reproduction mode of operation, the output of time delay relay 64*b* is passed to energize the solenoid 66 for retaining the card fixed with respect to the rotating drum 51 so that the head 53 may repeatedly scan the selected recording thereon for generating picture signals at video frequency, which signals are passed to the video input of the monitor 94 and utilized to modulate the screen of the cathode ray tube 95 with a still image.

In the event that it is desired to reproduce signals from a selected recording track of the record member 20 during a single pass of the information scanning transducer 53, or if it desired to record a signal, a bistable switch 66sw is provided in the output of time delay means 64*d* which, when opened, either manually or automatic means, prevents the output of said relay from energizing the solenoid 66 so that the card will be driven completely through the guide means 57 without stoppage.

In FIG. 10, a predetermining counter 97 is preset by a manual or automatic input control means 96 to generate a control signal upon receipt of a predetermined number of pulses from the transducer 52 mounted on drum 51 and generated as said transducer scans marks or pulse recordings on the recording area 27 adjacent the oblique tracks 23. In other words, a single pulse may be recorded or a mark provided adjacent each of the tracks 23 which, when reproduced as the transducer 53 scans said track by the travel of the card through the guide 57 may be employed by counting the total number of pulses so generated to indicate which track is in alignment with the information recording or reproduction transducer 53. by presetting the predeterming counter 97 to uncount after a receipt of a predetermined number of pulses from the marker pick-up transducer 52, the signal generated on the output of the counter 97 upon receiving said predetermined number of pulses may be utilized to close the normally open switch 93 for energizing transducer 53 in the reproduction mode. The output of predetermining counter 97 may also be passed to energize solenoid 66 to retain the card with the selected track in alignment with the transducer 53 so that the video signal recorded on said selected track may be repeatedly reproduced at video frequency to generate a still image on the screen of the monitor device 94. If the monitor device 94 is an image storage tube requiring that its beam be modulated by but a single-frame video picture signal to generate an image, then the card may be passed completely through the guide 57 without stoppage and without energizing solenoid 66.

As in FIG. 9, the control components of FIG. 10 may also be utilized for recording a predetermined video picture signal onto a selected track of the record member 20 by utilizing the output of counter 97 to energize the trigger input of an automatic deflection control circuit associated with the video camera scanning a document image field as defined in my said copending and parent applications.

In FIG. 11, selection of a particular oblique track of the record member 20 is effected by means of scanning codes such as binary codes 28 provided on the recording area 27 of the record member 20. Head 52, for example, may be operative to scan said binary codes and generate series binary signals on its output 99 which is connected to a series-to-parallel converter 100 having a plurality of outputs 100' extending to a code-matching relay 99 of the type defined in my said parent patent applications. Parallel inputs 98' to the code-matching relay 99 extend from a card reading device or other form of input means 98 operative to generate parallel codes which, when they are matched by the codes energizing the circuits 100' in the code-matching relay 99, cause said code-matching relay 99 to generate a control signal on its output 99' which is transmitted to the switching input of a normally open switch 93. A power supply PS is passed through switch 93 upon closure thereof to energize the transducer 53 in the act of reproducing the signal recorder on the selected track of the record member 20 passing through the guide 57. Said signal is then passed to the monitor 94 for generating an image on the viewing screen 95' thereof as described or is passed directly to a computer or other form of recording device.

It is to be noted that while the codes 28 provided on the border portion 27 of the magnetic recording card 20 are shown as recorded on extensions of the oblique tracks 23, said codes may also be recorded in alignment with the respective oblique tracks 23 but laterally extending across the record member 20 to be picked up by respective stationary magnetic reproduction heads supported, for example, by the side wall 58 of the guide 57 and located so as to scan the codes 28 on the recording area 27 as the card is driven therepast.

Synchronization between the position of the information recording or reproduction transducer 53 and the recording tracks 23 of record member 20 in the apparatus of FIGS. 5 and 6 may be effected in one or more manners. For example, if each information signal recording occupies the complete width of its respective recording track 23, then the reproduction head 53 will always scan information recorded on a track unless it is aligned precisely to scan the interface or border between two recording tracks. Accordingly, in such an arrangement, the card may be driven in any manner through the channel 57 provided that it is driven at a substantially predetermined constant speed.

In another form of the invention, a solenoid disposed at the inlet to the guideway 57 may normally prevent passage of the card and may be energized to permit the card to pass through the passageway 61 by a signal which is generated by limit switch or sensor operative when a predetermined portion of the drum passes said switch or sensor so that the card will be released to travel through the passageway 61 and, if it is driven at substantially constant speed thereafter, the oblique recording tracks thereof will be synchronized with respect to the rotating transducer 53.

Figure 12:
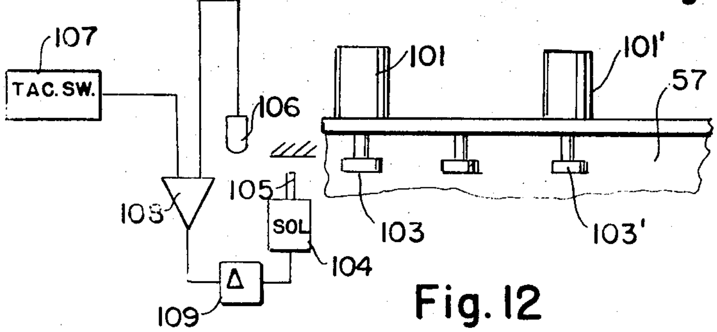
FIG. 12 is a control diagram illustrating means for controlling the movement of a card past a card transducer such that selected information may be recorded onto or reproduced from a selected area or track of the card.

In FIG. 12 is shown control means for synchronizing the movement of a card fed to a card-reading or reproduction apparatus of the type 50 shown in FIGS. 5 and 6. In the apparatus of FIG. 12, the card is assumed to be longer than the pathway defined by the guide 57 so that its leading edge may be gripped between powered rollers supported by or disposed on inlet 62 for driving the card at constant speed through the passageway 61 adjacent the drum and, upon passing through or leaving the exit guide 63, said leading edge may be gripped by a second pair of powered rollers for driving the card out of the passageway 61 onto the powered take-up conveyor 72.

In FIG. 12, a first constant speed gear motor 101 is supported adjacent to or by the wall of the inlet 62 and has its output shaft 102 connected to a frictional drive roller or wheel 103 cooperating with a second roller or wheel (not shown) for engaging the card as it is fed to the bite of said rollers. The motor 101 is operated continuously as is a second motor 101' located at the exit guide 63 for driving a wheel 103' cooperating with a second wheel thereat for continuing to drive the card through the passageway 61 and away from the housing after the trailing edge of the card has passed from between the rollers 103.

The card is initially held at the inlet 62 by a solenoid 104 having its shaft 105 or a mechanism connected thereto engaging the leading edge of the card and is released by activating solenoid 104 at a time such that the transducing heads mounted on the drum 57 are predeterminately located in their rotation so that when the card passes said heads, the heads will sweep the respective record tracks 23 of the card. The solenoid 104 is operated to retract and release the card upon receipt of a signal which is generated when the heads 52, 53 of the drum 51 have reached a predetermined point in their rotation. This action is effected by means of a sensing device 107 mounted to scan either the drum 51 or the shaft 56s of the drive motor 56 and operative to generate a pulse signal when said drum and drive motor output shaft have reached a predetermined point in their rotation. The sensing device 107 may comprise a so-called limit switch tachometer operating off the shaft of the drive motor or a photo-transistor scanning a mark or hole in the drum 51 or shaft 56s. The output of sensor 107 is passed to a logical AND switching circuit 108 having a second input from a sensor 106 operative to scan and detect the leading edge of a card fed to the inlet 62 just as it engages and is stopped by the shaft 105 of the solenoid 104. Thus, the AND switching circuit 108 generates a pulse on its output when both of its inputs become energized and the pulse is fed to a time-delay relay 109, the output of which is connected to the control input of the solenoid 104. The time interval of the delay circuit 109 is such that it will operate the solenoid 104 to release the card and the card will thereafter be driven at constant speed with respect to the transducing heads 52, 53 of the drum 51 whereby said heads will lie substantially aligned with consecutive recording tracks 23 of the card 20. Accordingly, time-delay relay 109 is preferably adjustable as to its time duration so that it may be manually adjusted to synchronize the travel of the card and the rotation of the heads 52, 53.

Figure 13:
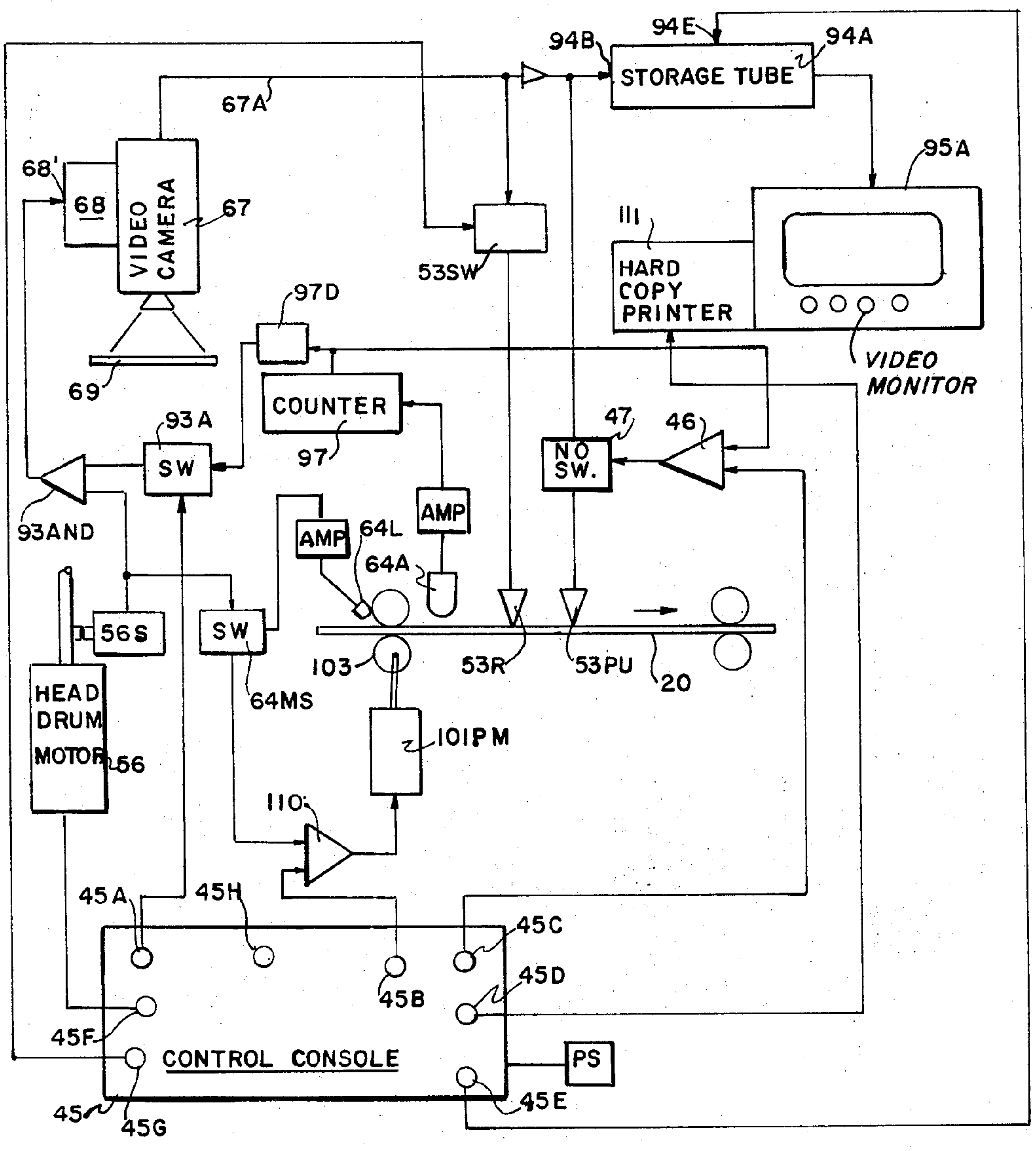
FIG. 13 is a control diagram illustrating a modified form of card recording and reproduction system.

In FIG. 13 is shown a combined magnetic card recording and reproduction system which employs separate magnetic transducers disposed closely adjacent each other and in circumferential alignment on a rotating drum of the type provided in FIGS. 5 and 6 to scan and either record on or reproduce from selected transverse or oblique tracks of a record card 20 of the type shown in FIG. 2. In FIG. 13 the card drive motor 101PM is a pulse operated stepping motor which is driven by pulses received from a limit switch 56S which operates in scanning a cam on the shaft of the head drum drive motor 56 and generates a stepping pulse on its output each time the magnetic recording and reproduction transducers, denoted respectively 53R and 53PU, mounted on the drum 51 come into alignment with or approach the recording area of the card 20 containing the oblique record tracks 23. The stepping motor 101PM is operable to step drive the card, each time it is pulsed, a degree equal to the longitudinal distance between tracks 23 of the card so that if said tracks are predeterminately located with respect to the leading edge of the card which is first fed to the bite of the stepping drive rollers, the transducers mounted on the drum 51 will initiate scanning each track as they come into alignment therewith. The system shown in FIG. 13 also utilizes a video storage tube 94A to receive and store selected full frame video picture signals of documents which video signals are generated either as selectively reproduced from the card or from a video camera. The output of storage tube 94A is fed to a conventional television receiver 95A to maintain a still image on its screen for monitoring purposes thus eliminating the need to repeatedly scan the selected track of the card as described to maintain the image on the receiver's screen.

The system of FIG. 13 includes a control console 45 having various bistable push-button switches 45A to 45H for gating electrical energy from a power supply PS to the operating components and subsystems illustrated. Operation of a first switch 45H connects the power supply PS to those components and subsystems which are not powered or controlled by the other switches.

RECORDING FULL FRAME VIDEO SIGNALS ON SELECTED TRACKS OF A MAGNETIC RECORD CARD

When it is desired to record a full frame video picture of a document onto a selected track of a selected card, the card is automatically or manually removed from storage and fed to a transducing apparatus of the type illustrated in FIGS. 5 and 6 after certain preliminary operations have been performed to effect such recording. The document containing the image or information desired to be recorded is placed on a conveyor or platform 69 and disposed thereby in the scanning field of a television camera 67 having a read-beam deflection controller 68 for controlling its read-beam to full frame scan its image field when an input 68' thereto is activated by a trigger pulse. As hereinbefore indicated, details of a full frame scanning control circuit for controlling the read beam of a television camera to effect full frame scanning along a predetermined scanning path when pulse activated, are provided in my copending application Ser. No. 225,173. The output 67A of camera 67 extends to the video signal recording head 53R through a switch 53SW which is closed by operating manual switch 45G on the control console or by otherwise generating a switch closing signal and applying same to the switching input of the switch. A second bistable switch 93A in the output of the described frame pulse counter 97 is also closed for recording. As the card is fed to the bite of the drive rolls 103, the leading edge thereof is detected by a photoelectric or limit switch detector 64L which generates and feeds a pulse to the switching input of a normally open, monostable switch 64MS which is slow-to-open after being so closed such that it is retained closed during the time it takes the card to be completely driven past the magnetic recording transducer 53R. While so closed, switch 64MS passes the pulses generated by limit switch 56S scanning the shaft of the head drum motor 56 to a logical AND circuit 110, the other input to which AND circuit having previously been energized by closure of panel switch 45B in preparing for selective track recording. The motor 101PM is thus pulsed to drive the card in such a manner that the drum rotated recording head comes into alignment with and completely scans each track of the card during each or multiples of revolutions of the drum.

The output of pulse counter 97, which has been preset to uncount when a predetermined number of pulses have been received on its input from photoelectric detector 64A scanning marks provided along a longitudinal track of the card in alignment with each of the oblique tracks 23, is applied to a time delay relay 97D which generates and passes a signal on its output through closed switch 93A to one switching input of a logical AND circuit 93AND for a duration which is equal to the time it takes the drum mounted head 53R to make one revolution or scanning sweep so that whenever limit switch 56S is activated thereafter and its output is applied to the other input of circuit 93 and, a pulse will be generated on the output thereof which may be applied to the trigger input 68', of camera control circuit 68 thus initiating generation of the full frame video picture signal of the document in the scanning field of the camera which is transmitted to head 53R and recorded along the selected track of the record card. The head 53R may include a magnetic erase circuit or auxilliary head so disposed and operable when input 68' is energized to erase the previously recorded signal from the selected track of the card.

SELECTED FULL FRAME VIDEO SIGNAL REPRODUCTION CYCLE

When it is desired to reproduce a selected full frame video picture signal from a selected track of a selected card, the card is fed to the transducing apparatus described and illustrated in FIGS. 5 and 6 or other suitable apparatus after effecting certain other preliminary control functions. The counter 97 is preset to uncount upon receipt of the number of pulses generated by frame mark detector 64A in scanning those marks which extend to the selected frame or track 23 containing the selected full frame video picture signal. One input to an AND circuit 46 is activated by closure of a switch 45C on the control console 45. The output of AND circuit 46 is connectd to the switching input of a normally open, slow-to-open after closing monostable switch 47 which is connected between the video reproduction transducer 53PU and the input 94B to the storage tube 94A. The output of counter 97 is connected to the other input to AND circuit 46 so that an output is generated to close switch 47 when the counter 97 uncounts assumning that switch 45C has been closed. Switch 47 is operable to open after closing after having been closed for the time required for the reproduction head 53PU to completely scan the selected recording so that only the selected video signal recording will be reproduced.

Notation 111 refers to a hard copy printer which may be operated by means of a switch 45D located on the console to effect the production of a print of the information displayed on the face of the screen of monitor 95A.

In a preferred form of the apparatus of the system of FIG. 13, the recording head 53R is operable to magnetically record a track of information generated by a modulated electrical or video signal fed thereto, the width of which recording is greater than the width of the magnetic reproduction head 53PU so that certain variations in the longitudinal positioning of a card along the transport or guide means therefore may be tolerated without loss of signal during reproduction. In other words video pick-up transducer 53PU which is disposed in circumferential alignment with and behind the recording head 53R may be operable to reproduce recorded video signals even if it is somewhat off center from the record track during its scanning sweep thereof.

I claim:

1. An information storage and retrieval system employing a plurality of record cards, each containing a plurality of recordings of document information, and including means for selectively monitoming said information without directly viewing said card, comprising:

a. a card reading device including a support,
b. transducing means supported by said support for generating electrical signals representative of document information scanned by said transducing means,
c. said transducing means having an output,
d. a monitor means connected to said output of said transducer means,
e. means for guiding and driving a card fed to said reading device relative to said transducing means to bring the recordings into operative relationship with said transducing means whereby said transducing means may read selected information recorded on said card,
f. first control means for energizing and de-energizing said transducing means whereby signals generated by the latter appear at said output,
g. means for generating control signals to predeterminately operate said first control means to energize same after a card has been fed to said reading means, whereby selected document information recorded on a card will be read by said transducing means,
h. said monitor means including image generating means responsive to the signals generated by said transducing means in scanning a selected recording of a card for forming an image representative of the selected document information scanned, whereby said selected information may be viewed and monitored, and
i. means for successively repeating scanning of said selected recording to sustain a still image at said monitor means over an extended period of time for viewing of said image.

2. A system in accordance with claim 1, said cards having a plurality of magnetic recording tracks predeterminately located thereon, a plurality of document image signals recorded on said tracks and means for generating a control signal when a selected magnetic recording track and said transducing means are in operative relationship with each other, whereby an electrical signal of a selected recording on said card will be generated by said transducing means and will be operative to cause the generation of an image on said monitor means representative of the document recording scanned.

3. A system in accordance with claim 2, said support including a housing, said transducing means comprising a plurality of magnetic pick-up heads within said housing and each operative to scan a different record track of a card fed through said housing, and means for selectively energizing one of said pick-up heads as the card is passing through said housing to scan a selected recording on said card and generate a selected information signal and generate a pictorial representation thereof on said monitor means.

4. A system in accordance with claim 3, said plurality of recordings on each card each comprising a composite video picture signal having components for both deflection controlling and intensity modulating the write beam of said cathode ray device.

5. A system in accordance with claim 3, whereby said plurality of recordings on each card each comprise at least one video picture signal derived from a television camera pick-up and generated when the read-beam of said camera has scanned a full frame of information in the scanning field of the camera, said monitor means including a cathode ray device employing a beam to write information on a display screen thereof, said video picture signal being operative to intensity modulate said beam during its sweep of said display screen.

6. A system in accordance with claim 4, in which each of said cards has a track containing recordings of vertical and horizontal sync signals and equalizing signals sufficient to control the beam of said cathode ray device in effecting a full frame scan of its image screen, said plurality of picture signals being predeterminately located on said card with respect to said recordings of vertical and horizontal sync signals, and further transducing means for reproducing said vertical and horizontal sync and equalizing signals during a reading cycle in which a selected picture signal is reproduced from said card and applying said sync and equalizing signals to said cathode ray device.

7. An apparatus in accordance with claim 1, whereby said information signals are arranged along a plurality of parallel tracks which are oblique to the longitudinal axis of said record member, said reproduction transducing means being operative to scan selected of said oblique parallel tracks, and means for selectively predeterminately locating said transducing means and a selected of said tracks whereby a selected information signal may be reproduced from said selected track.

8. An apparatus in accordance with claim 7, in which said support includes a movable part to which said transducing means is mounted, means for rotating said part together with said transducing means and means for locating said record member in relation to said part, whereby the rotating transducing means will sweep a selected of said tracks.

9. An apparatus in accordance with claim 8, including means for predeterminately wrapping said record member around said drum to effect helical scanning of said record member by said transducing means.

10. An apparatus in accordance with claim 8, in which said movable part comprises a drum, said transducing means having a head disposed at the periphery of said drum, including helical guide means for predeterminedly curvedly deforming said record member to conform to the peripheral surface of said drum, whereby said head is pre-positioned with respect to said record member by said drum as it rotates and sweeps the selected track.

11. An apparatus in accordance with claim 10, including means for predeterminately stopping said record member predeterminately located with respect to said drum while retaining said drum rotating, whereby said head sweeps a selected track for a plurality of times so as to maintain a still image on the screen of said visual monitor means.

12. An information storage and retrieval system employing a plurality of record cards, each containing a plurality of information recordings and including means for selectively monitoring said information without directly viewing said card, comprising:

a. a card reading device including a support mounted for rotation about an axis,
b. transducing means supported by said support at the periphery thereof for generating electrical signals representative of information recorded on said cards and scanned by said transducing means, c. said transducing means having an output, d. means for guiding and driving a card fed to said reading device relative to said transducing means in a helical path about said axis as a center to bring the recordings into operative relationship with said transducing means whereby said transducing means may read selected information recorded on an oblique track on said card, and e. control means for energizing and de-energizing said transducing means whereby signals generated by the latter appear at said output.

13. An information storage and reproduction system having erasable information recorded as signals on magnetic recording areas of a plurality of magnetic record cards; a reproduction unit including means for receiving and guiding individual record cards along a predetermined path extending through said unit; magnetic reproduction transducing means including at least one magnetic pick-up head prepositioned with respect to said card guiding means; drive means for causing relative movement of a card and said pick-up head such that the pick-up head scans the magnetic recording area of a card when the latter is operatively aligned with the pick-up head, with signals recorded on the magnetic recording areas of the cards operable to modulate said magnetic reproduction transducing means to generate information signals on the output of the transducing means; monitor means including a visual display unit operatively connected to the output of the transducing means and operative to receive the output signals thereof whereby the display of the visual display unit is modulated in accordance with the characteristics of said output signals and the recorded information which is reproduced from the scanned card is visually displayed for monitoring purposes.

14. In a record system having information recorded on magnetic recording areas of a plurality of record cards with the magnetic recording area of each card containing at least one full-frame video picture signal predeterminately located thereon, the combination comprising a reproduction unit including a housing, magnetic transducing means including a video transducer supported by said housing, guide means for guiding individual record cards past said transducing means whereby the magnetic recording areas of the cards are operatively scanned by the transducer, feed means for moving individual record cards through said housing along said guide means, motor means operative to drive said feed means, means for energizing said transducing means as a card is driven past said transducer to cause a video picture signal recording on said card to modulate the output of said transducing means, a monitor-receiver operatively connected to said video transducer including a viewing screen and image generating means responsive to video picture signals transmitted thereto from said transducing means whereby the received video signals are operative to generate images on said viewing screen which images are representative of the picture signals magnetically recorded on and reproduced from said cards, control means for said feed means operative to cause said feed means to present individual cards to said transducer and to remove cards from said housing after said transducer has reproduced a full-frame video picture signal and the monitor-receiver has generated an image on its viewing screen which image is representative of the information contained in said video signal.

* * * * *